United States Patent
Bringewatt et al.

(10) Patent No.: US 8,407,919 B2
(45) Date of Patent: Apr. 2, 2013

(54) METHOD FOR THE RECOVERY OF WASTE HEAT FROM HEATED LAUNDERETTE MACHINES

(75) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 615 days.

(21) Appl. No.: 12/530,120

(22) PCT Filed: Feb. 6, 2008

(86) PCT No.: PCT/EP2008/000891
§ 371 (c)(1),
(2), (4) Date: Mar. 11, 2010

(87) PCT Pub. No.: WO2008/113430
PCT Pub. Date: Sep. 25, 2008

(65) Prior Publication Data
US 2010/0212866 A1 Aug. 26, 2010

(30) Foreign Application Priority Data

Mar. 19, 2007 (DE) .......................... 10 2007 013 717
Sep. 11, 2007 (DE) .......................... 10 2007 043 212

(51) Int. Cl.
*D06F 71/34* (2006.01)
*F26B 21/06* (2006.01)
(52) U.S. Cl. ............................................... 38/14; 34/86
(58) Field of Classification Search ................. 34/79, 86, 34/134, 467; 165/104.11; 237/9 R
See application file for complete search history.

(56) References Cited

U.S. PATENT DOCUMENTS

| 2,366,332 | A | * | 1/1945 | Harrison et al. | ............... | 237/9 R |
| 4,457,087 | A | * | 7/1984 | Wolff et al. | ........................ | 38/55 |
| 4,509,345 | A | | 4/1985 | Alio | | |
| 4,519,440 | A | * | 5/1985 | Weitman | ................... | 165/104.11 |
| 2007/0251115 | A1 | * | 11/2007 | Bringewatt et al. | ............. | 34/134 |
| 2010/0107438 | A1 | * | 5/2010 | Bringewatt et al. | ............. | 34/467 |

FOREIGN PATENT DOCUMENTS

| DE | 3105846 | A1 | | 3/1982 |
| DE | 3111680 | A1 | | 10/1982 |
| DE | 003426184 | A1 | * | 3/1985 |
| EP | 0080573 | A2 | | 9/1982 |

OTHER PUBLICATIONS

International Search Report issued on corresponding International Application No. PCT/EP2008/000891 filed Feb. 6, 2008.

* cited by examiner

*Primary Examiner* — Ismael Izaguirre
(74) *Attorney, Agent, or Firm* — Laurence P. Colton; Smith Risley Tempel Santos LLC

(57) ABSTRACT

A method for the effective recovery of as large a portion as possible of the energy in the waste heat of a trough mangle (10) or other launderette machines. To this end, provision is made for a portion of the energy contained in the waste heat to be recovered by cooling the waste heat in a heat exchanger (14), with the waste heat being cooled to such an extent that it falls below the dew point and condenses, with the result that the energy released during condensation and at least a large portion of the energy from the condensate can also be recovered. In this way, it is possible for up to half the residual energy in the moist waste air from a trough mangle (10) and the waste gas from a heating device to be recovered and reused again.

15 Claims, 3 Drawing Sheets

METHOD FOR THE RECOVERY OF WASTE HEAT FROM HEATED LAUNDERETTE MACHINES

STATEMENT OF RELATED APPLICATIONS

This application is the U.S. National Phase Under Chapter II of the Patent Cooperation Treaty (PCT) of PCT International Application No. PCT/EP2008/000891 having an International Filing Date of 6 Feb. 2008, which claims priority on German Patent Application Nos. 10 2007 013 717.8 having a filing date of 19 Mar. 2007 and 10 2007 043 212.9 having a filing date of 11 Sep. 2007.

BACKGROUND OF THE INVENTION

1. Technical Field

The invention relates to a method for the recovery of waste heat from heated launderette machines, in particular mangles, dryers and finishers.

2. Related Art

In commercial launderettes, considerable amounts of energy, specifically primarily thermal energy, are sometimes required to operate the launderette machines. This applies primarily to mangles, dryers and finishers. This energy is not carried out of the launderette by the washed laundry because the laundry leaves the launderette at the same temperature at which it was delivered as dirty laundry.

To date, it has been customary to route all the waste heat produced or discharged during operation of launderette machines to the outside. In this context, "waste heat" is to be understood as moist waste air from launderette machines and waste gases from heating devices for generating, for example, steam and heated oil for operating the launderette machines. Since energy costs are constantly increasing, the economic viability of a commercial launderette is considerably impaired when the waste heat is routed to the outside without being used.

BRIEF SUMMARY OF THE INVENTION

Taking the above as a starting point, the invention is based on the object of specifying a method for the recovery of thermal energy, in particular moist waste air, which is discharged by launderette machines, in particular mangles, dryers, finishers or the like, as a result of which it is possible to reduce the energy requirement of a commercial launderette.

A method for achieving this object is a method for the recovery of waste heat from heated launderette machines, in particular trough mangles, dryers and/or finishers, characterized in that the condensation energy and/or the energy in the condensate of the waste heat is at least partially recovered. Provision is made to also recover such energy from the waste heat (moist waste air and/or waste gas) which is contained in the condensate of the waste heat and/or is produced when the waste heat condenses. The condensation energy and the energy in the condensate make up a large portion of the energy from the waste heat, with the result that a large portion of the energy can be drawn by recovering at least some of this energy from the waste heat before the waste heat is routed to the outside. As a result, a large portion of the energy which is produced during operation of heated launderette machines can be reused.

According to a preferred development of the method, provision is made for the waste heat to be cooled to such an extent that it condenses and the energy which is produced in the process and also the energy in the condensate of the cooled waste heat are at least partially recovered. Therefore, the energy from the waste heat is then recovered until said waste heat condenses. However, not only the condensation energy, but preferably also the energy from the condensate, which forms when the waste heat is cooled further, is at least largely recovered according to the invention.

A further preferred refinement of the method makes provision for the waste heat to be cooled to below the dew point and the energy which is produced in the process to be at least partially, preferably largely, recovered. It is therefore possible to reuse not only the energy from the waste heat, preferably the energy in the moist waste air from launderette machines and in the waste gas from heating devices, until the dew point is reached, the said energy including the condensation energy, but also more energy in the waste heat, specifically such energy which is contained in the waste heat even after it has fallen below the dew point and/or is produced when the waste heat falls below the dew point. The more energy is recovered from the waste heat below the dew point, the greater is the degree of efficiency of energy recovery. A large portion of the energy supplied to the respective launderette machine, specifically almost all the energy with the exception of the radiated heat, can be recovered by using the energy in the waste heat below the dew point too.

Provision is also made for the energy from the waste heat to be recovered by at least one heat exchanger. This energy is energy which is produced when the waste heat is cooled, in particular also the condensation energy, and also the energy which is produced when the moist waste air is cooled to below the dew point. Heat exchangers are particularly suitable for drawing a large portion of the energy contained in waste heat, specifically also from the condensate which is in the liquid state, but still warm enough, which is produced when the waste heat is cooled to below the dew point.

It is feasible to recover all the waste heat using just one single heat exchanger. In this case, both moist waste air from the respective launderette machine and also the waste gas from a heating device for supplying the required energy to the launderette machine is fed to this heat exchanger. However, it is particularly advantageous for both the heating device and the launderette machine to at least each have their own associated heat exchanger. In this case, both the energy from the launderette machine and from the heating device can be recovered by the respective heat exchanger in a controlled manner. In this case, the heat exchangers may be different since they are matched firstly to the different energy contents of the moist waste air from the launderette machine and secondly to the waste gas from the heating device, in particular with regard to the heat-exchange performance.

If each launderette machine has its own associated heating device, this launderette machine has at least one associated heat exchanger which recovers the energy in the waste gas from the heating device of the launderette machine and possibly also the energy from the moist waste air from the launderette machine. However, it is also feasible to provide a central heating device in the launderette, the said central heating device centrally supplying the required energy to all or a plurality of the launderette machines. In this case, this central heating device has at least one associated heat exchanger. This central heat exchanger preferably serves only to recover the residual energy from the waste gas from the central heating device, whereas either each launderette machine has its own associated heat exchanger or the moist waste air from the launderette machines is conducted to a central heat exchanger for the purpose of recovering the moist waste air from the launderette machines. The said central heat exchanger may also be the heat exchanger of the central heating device. This single central heat exchanger then has to be correspondingly dimensioned.

The energy drawn from the waste heat, that is to say the moist waste air from the launderette machine or the waste gas from the heating device, by at least one heat exchanger is used to increase the temperature of a liquid, in particular a heat exchanger liquid. The heat exchanger liquid heated in this way, it being possible for the said heat exchanger liquid to be fresh water in the simplest case, can be used for an extremely wide variety of purposes, in particular within the launderette, for example in order to heat up the fresh water which is required for washing machines, but also for heating purposes. Therefore, it is also possible to use the recovered energy in the form of the hot water for external heating purposes, for example for remote heating purposes.

It is also feasible to use a heat exchanger liquid which has a boiling point which is above 100° C., that is to say is higher than the boiling point of water. The heat content of the heat exchanger liquid can be increased as a result. A relatively small quantity of heat exchanger liquid can then absorb a large amount of energy.

Provision is preferably made for the energy obtained when the waste heat is recovered from at least one launderette machine, in particular thermal energy, to be used to operate a different launderette machine which likewise requires thermal energy. In this way, the obtained energy remains within the launderette.

However, according to another preferred refinement of the method, it is also feasible to reuse the energy, which is obtained when the waste heat from a launderette machine is recovered, during operation of the same launderette machine. This therefore produces an energy circuit in the relevant launderette machine, with the result that only relatively little new energy has to be fed to the said launderette machine, specifically only energy which cannot be recovered, for example radiation energy and residual energy in the moist waste air and/or in the waste gas which does not allow economic recovery.

Provision is further made for the waste heat used to be moist waste air from a mangle, a dryer and/or a finisher. These launderette machines are usually operated using hot steam, hot air or heated oil as the heat carrier medium which still contains a large amount of energy when it leaves the launderette machine in the form of moist waste heat. Condensate which forms when the waste heat is cooled to below the dew point primarily still contains a considerable amount of energy which is recovered according to the invention, specifically preferably including the condensation energy.

BRIEF DESCRIPTION OF THE DRAWING FIGURES

Preferred exemplary embodiments of the invention will be explained in greater detail below with reference to the drawing, in which.

DETAILED DESCRIPTION OF PREFERRED EMBODIMENTS

The exemplary embodiments shown in the figures explain the invention in connection with a trough mangle 10 for commercial launderettes. The trough mangle 10 (shown only schematically in the figures) has a frame 11 with a mangle trough and a mangle roller which can be driven in rotation. However, the trough mangle 10 may also have a plurality of mangle rollers and mangle troughs.

The stationary mangle trough surrounds approximately the lower half of the periphery of the mangle roller. The mangle trough can be heated. To this end, flow channels for a heat carrier medium are arranged within the mangle trough. For example, the mangle troughs may be designed in the manner of cushion plates. A mangle trough of this type is formed from two approximately semicircular overlapping metal sheets which are tightly welded all around and are additionally connected to one another in the region of the surface by a grid of weld spots. Between the weld spots, the metal sheets are spaced apart from one another in order to form the flow channels for the heat carrier medium flowing through the mangle trough.

Figure 1:
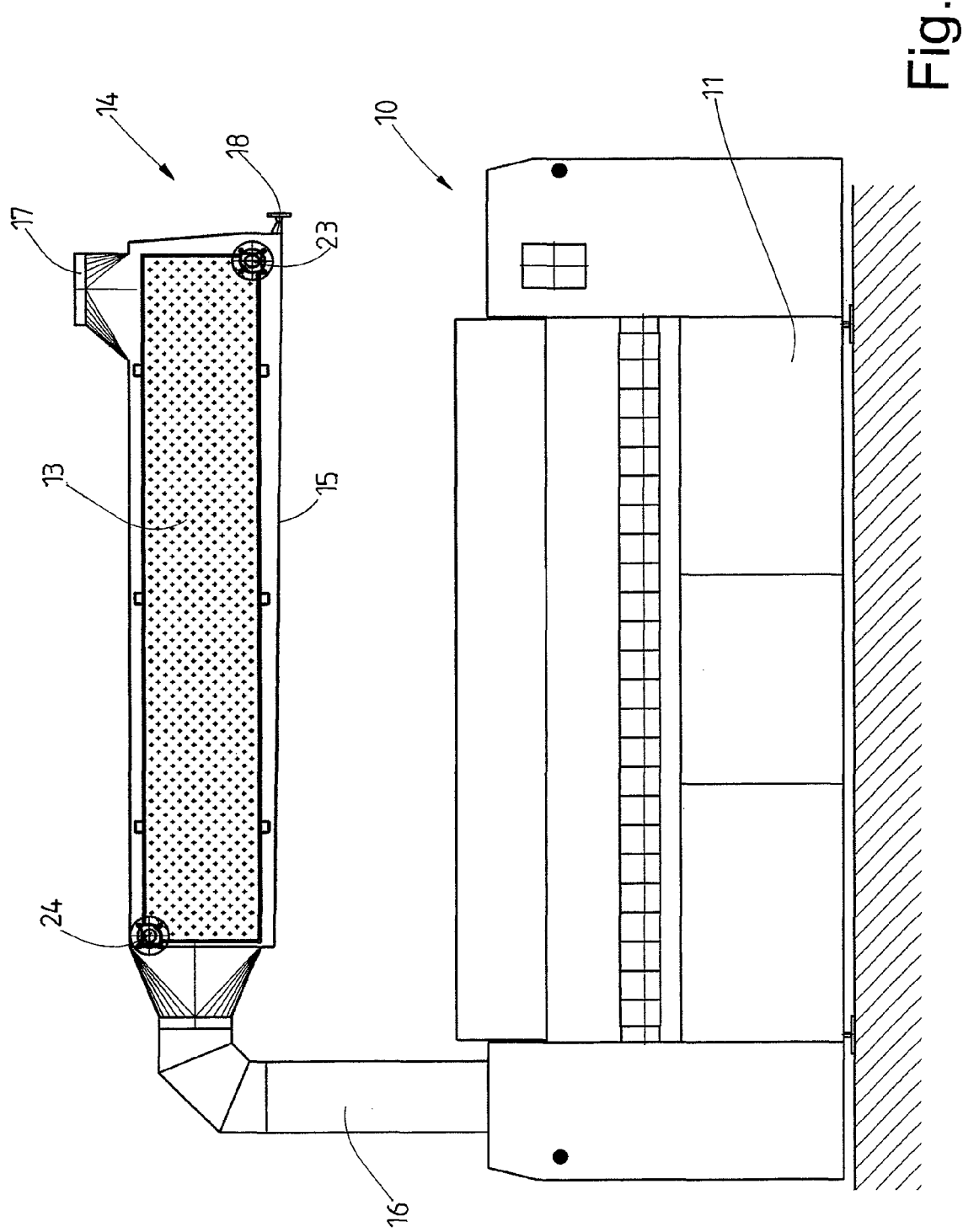
FIG. 1 shows a trough mangle with a heat exchanger.

The trough mangle 10 shown in FIG. 1 is heated by steam. That is to say, in this trough mangle 10, steam, in particular hot steam, is conducted through the flow channels in the mangle trough. In the exemplary embodiment shown here, the steam is generated centrally in the launderette and routed through the mangle trough of the trough mangle 10.

The steam-heated mangle trough heats the still damp laundry which is located between the mangle trough and the mangle roller during the mangling process. The laundry is moved along the mangle trough by the rotating mangle roller. In the process, the residual moisture of the laundry evaporates. This residual moisture is bound in the hot air generated by the heated mangle trough, as a result of which moist waste air is produced. This waste air is discharged through the mangle roller by the moist waste air being sucked into the mangle roller and discharged from the mangle roller.

The trough mangle 10 has an associated heat exchanger 14. In this case, said heat exchanger may, in principle, take all conceivable forms of heat exchangers 14. In the exemplary embodiment shown, the heat exchanger 14 is in the form of a horizontally running plate heat exchanger. The said plate heat exchanger has a plurality of heat exchanger plates 13 which are situated at a distance next to one another and have rectangular surface areas. The long longitudinal edges of the heat exchanger plates 13 run horizontally; the shorter transverse edges, in contrast, run vertically. The heat exchanger plates 13, like the mantle trough, may be in the form of cushion plates with internal flow channels. The plurality of heat exchanger plates 13 which are situated at a distance and parallel next to one another are arranged in a sealed housing 15.

The heat exchanger 14 is connected to the trough mangle 10 by a waste-air channel 16. From one end of the mangle roller, the moist waste air collected therein is conducted to one end of the heat exchanger 14 through the waste-air channel 16. For this purpose, the waste-air channel 16 issues into the end of the housing 15 of the heat exchanger 14. The moist waste air arriving from the mangle roller flows past the outside of the heat exchanger plates 13, that is to say through flow paths between adjacent heat exchanger plates 13. In the process, the liquid, specifically heat exchanger liquid, which is conducted through the heat exchanger plates 13 of the heat exchanger 14 is heated by the residual energy from the moist waste air from the trough mangle 10. The liquid is water, for example. However, it is also feasible to use a high-boiling heat exchanger liquid which has a higher boiling point than water. The moist waste air which is cooled and condensed as it flows along the outside of the heat exchanger plates leaves the housing 15 of the heat exchanger 14 through an outlet nozzle 17 which is arranged in that end region of the heat exchanger 14 which is opposite the waste-air channel 16. Furthermore, the heat exchanger 14 has a condensate connection 18 at the rear lower end of the housing 14. Liquid condensate which is produced when the moist waste air from the mangle roller is cooled can be discharged via the said condensate connection, with, according to the invention, a large portion of the thermal energy contained in the condensate having been drawn from the condensate and thus recovered beforehand.

The housing 15 of the heat exchanger 14 has, in a rear lower end region, a feed connection 23 for cold heat exchanger liquid, specifically water in the simplest case. This water or another heat exchanger liquid serves to feed the secondary circuit of the heat exchanger 14. Heat exchanger liquid which is heated by the heat exchanger plates 13 of the heat exchanger 14 is routed out of the heat exchanger 14 via a discharge connection 24 in the front upper end region of the housing 15.

The method according to the invention is distinguished in that the moist waste air from the mangle roller, said waste air being vapours or steam, but also the energy produced when the moist waste air condenses and/or the energy contained in the condensate are/is reused. That is to say, the moist waste air from the mangle roller is cooled in the heat exchanger 14 to such an extent that it condenses, with not only the energy which is produced in the process being recovered, but also the energy which is produced when the condensate is cooled further in the region of the heat exchanger 14. Therefore, the moist waste air from the trough mangle 10 is cooled to below the dew point. As a result, a large portion of the energy supplied to the trough mangle 10 can be recovered again and reused.

Since the heat recovery in the heat exchanger 14 is performed by cooling the moist waste air from the mangle roller to below the dew point, and in the process the energy from the condensing waste air and/or from the condensate is recovered, at least 50% of the energy fed to the trough mangle 10 can be recovered and reused.

The recovered energy serves to heat liquid, in particular water, which is conducted through the heat exchanger 14, specifically its secondary circuit. The heated water can be used within the launderette, specifically in areas where warm water, for example warm fresh water, is required. However, the obtained energy can also be used for entirely different purposes, for example heating purposes. It is also feasible to route the heated liquid, in particular when it is a high-boiling heat exchanger liquid and not water, through a further heat exchanger in order, for example, to heat fresh water for washing machines.

The trough mangle 10 shown in FIG. 1 is supplied with steam or another form of thermal energy, for example heated oil, by a central heating device. The central heating device may likewise have an associated heat exchanger which draws at least a portion, preferably a large portion, of the energy from the waste gas, for example, from a burner of the central heating device, before the waste gas is routed to the outside through the flue. According to the invention, the waste gas is also cooled here until it condenses. As a result, the condensation energy which is produced during the condensation process can be at least partially recovered, as can, preferably additionally, also at least a portion of the energy still contained in the condensate.

Figure 2:
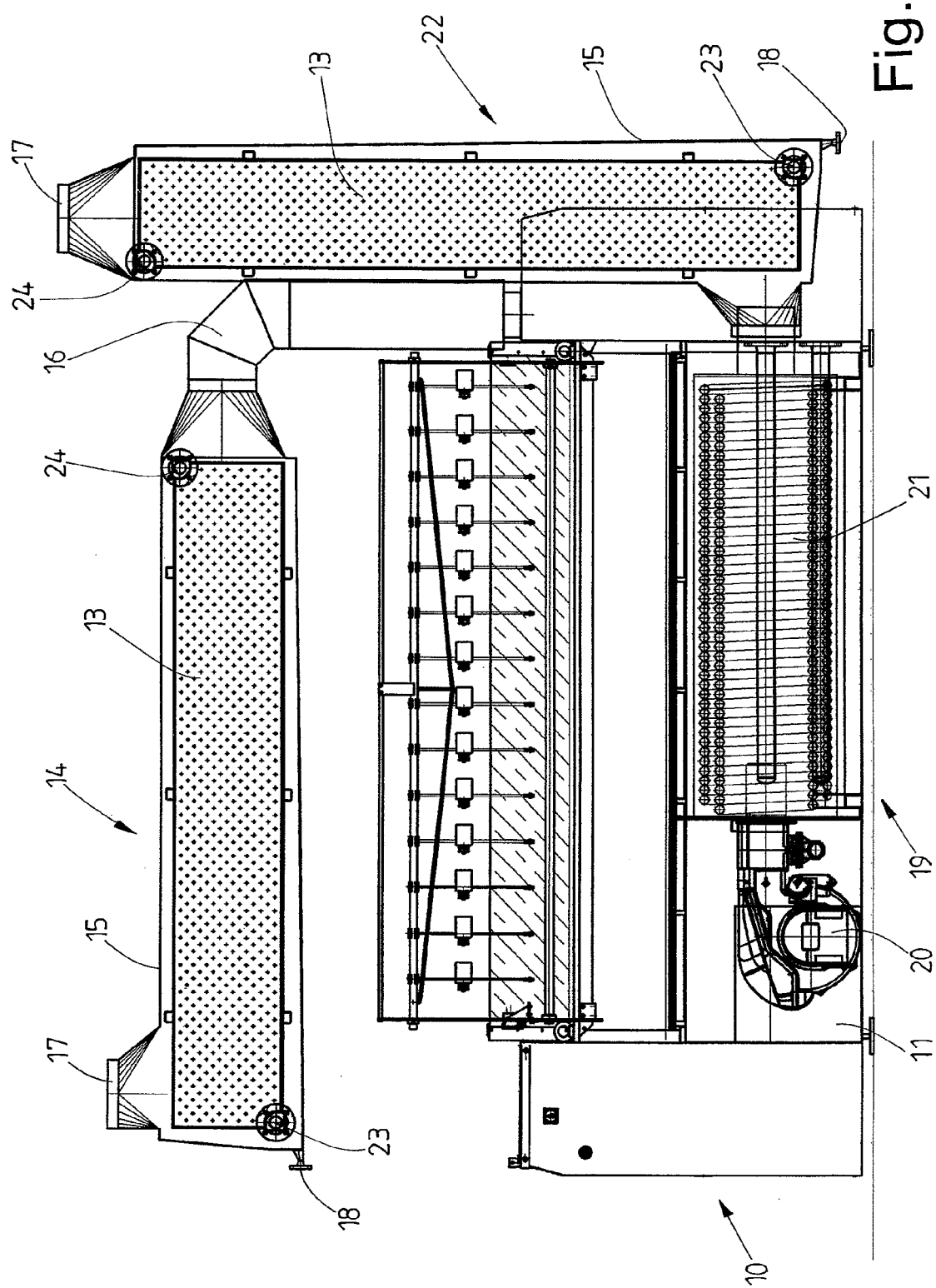
FIG. 2 shows a trough mangle with its own heating device and a plurality of heat exchangers.

FIG. 2 shows the trough mangle 10 in which the medium for heating the mangle trough is heated by an integrated heating device 19 which is associated with the trough mangle 10. In the exemplary embodiment shown, the trough mangle is a trough mangle 10 with an oil-heated mangle trough. The oil is heat carrier oil which is heated in a heat exchanger 21 which is fired by a burner 20. The oil heated in this way is then routed through the mangle trough of the trough mangle 10 and as a result the trough mangle 10 is heated.

In the case of this oil-heated trough mangle 10 too, moist waste air accumulates in the mangle roller, said waste air, as in the exemplary embodiment according to FIG. 1, being recovered by the heat exchanger 14 which is associated with the trough mangle 10.

The burner 20 for heating oil for heating the mangle trough generates waste gas, from which the residual energy is likewise partially recovered. To this end, provision is made, in the exemplary embodiment according to FIG. 2, to provide a second heat exchanger 22 which serves to recover heat. The heating device 19 is associated with this second heat exchanger 22, so that it recovers only the residual energy from the waste air from the burner 20. In this case, the waste gas is also preferably cooled to below the dew point. In the process, condensate is produced, even when thermal energy which is contained in the waste gas is recovered. The condensation energy which is produced in the process and the energy in the condensate are at least partially recovered, so that they can be reused, preferably in the launderette, and primarily for the operation of launderette machines which require thermal energy. The heat exchanger may be constructed exactly like the heat exchanger 14 for the purpose of recovering the moist waste air from the mangle roller, that is to say as a plate heat exchanger with heat exchanger plates 13 formed from cushion plates. It is also feasible to form the heat exchanger 22 in another way which is conventional for heat exchangers. The upright heat exchanger 22 for the waste gas from the heating device 19 has a feed connection 23, which, at its lower end region, issues into the housing 15, for a heat exchanger medium, for example water. The heated water or another heat exchanger medium of the secondary circuit leaves the housing 15 of the heat exchanger 22 in the upper end region of the said housing through a discharge connection 24.

A portion of the residual energy from the waste gas of the burner 20 for heating the mangle trough can also be recovered by the heat exchanger 22. It is irrelevant here whether the burner 20 is gas- or oil-heated.

The cooled waste gas from the burner 20 exits the upper end of the preferably upright elongate heat exchanger 22 to the outside, specifically preferably via a flue which is not shown in FIG. 2. The waste air which is cooled in the heat exchanger 14 may also possibly be routed from the trough mangle 10 to the outside via the same flue.

Figure 3:
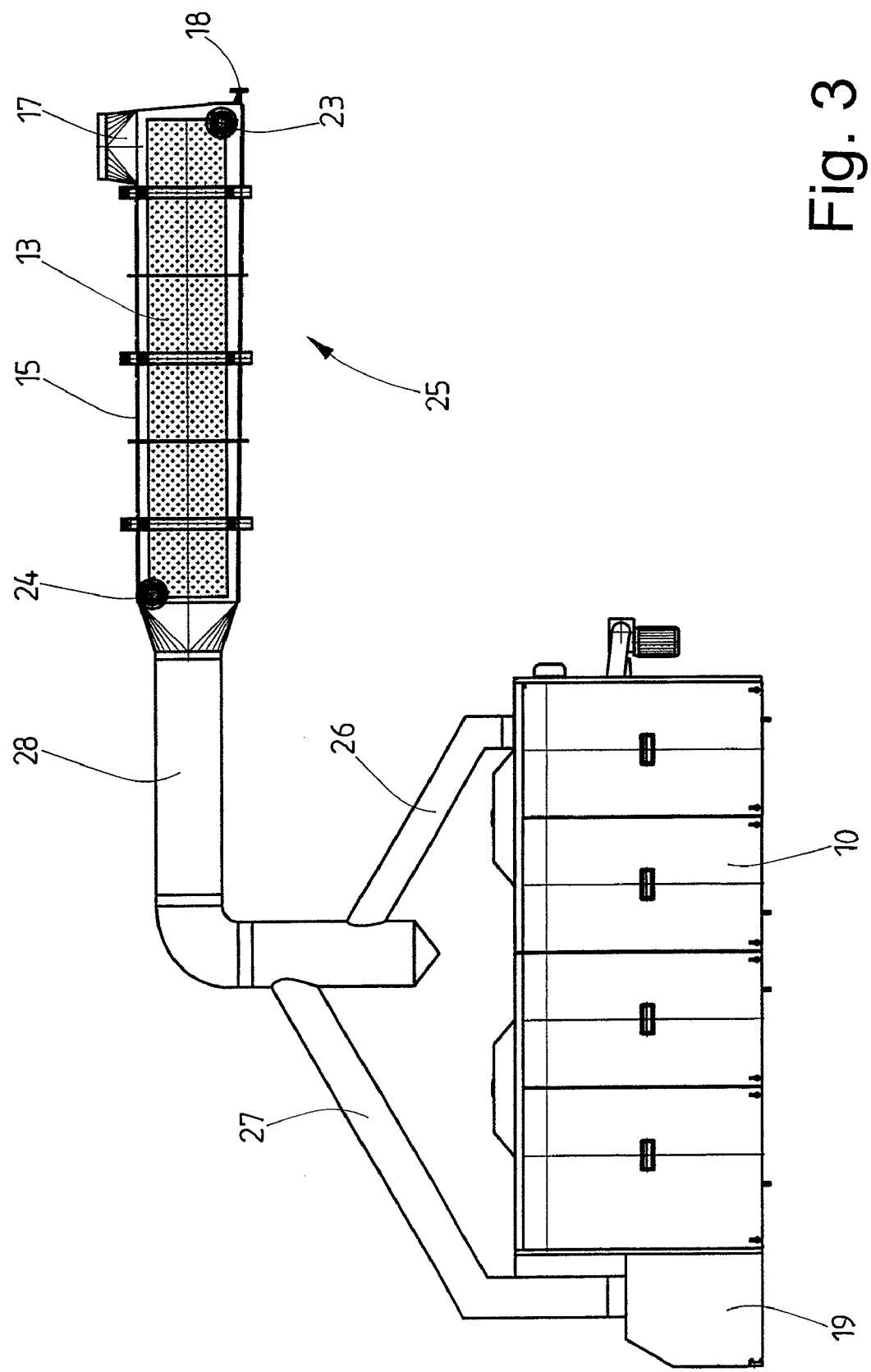
FIG. 3 shows a trough mangle with a heating device and a heat exchanger.

FIG. 3 shows a further exemplary embodiment of the invention, which differs from the exemplary embodiment of FIG. 2 in that only a single heat exchanger 25 is provided for recovering the residual energy from the moist waste air from the trough mangle 10 and the waste gas from the heating device 19 of the trough mangle 10. A waste-air conduit 26 of the trough mangle 10 and a waste-gas conduit 27 of the heating device 19 for providing the energy required for the trough mangle 10, for example steam or heated oil, are combined to form a common header conduit 28 which is guided to one end of the heat exchanger 25 which is arranged horizontally (lying flat) in the exemplary embodiment shown. In any case, the heat exchanger 25 is, in principle, constructed exactly like the heat exchanger 14. Accordingly, identical reference numerals are used for identical parts and reference is made to the description of the heat exchanger 14 in conjunction with the exemplary embodiment of FIG. 1.

The preferred exemplary embodiment of the invention, which is described below in conjunction with a trough mangle 10, can also be used in other launderette machines which have a high energy requirement, for example dryers and finishers. In this case too, so much energy is drawn from the waste heat, at least the moist waste air and/or vapours by cooling that the waste heat falls below the dew point and the moisture in the waste air condenses, with the condensation energy and the energy from the condensate being at least largely recovered according to the invention, just like the remaining energy from the moist waste air which is produced when the said moist waste air is cooled to the dew point. Similarly, in the case of other launderette machines, a portion, preferably a large portion, of the residual energy can be drawn from the waste gas from a heating device and reused.

List of Reference Symbols
10 Trough mangle
11 Frame
13 Heat exchanger plate
14 Heat exchanger
15 Housing
16 Waste-air channel
17 Outlet nozzle
18 Condensate outlet
19 Heating device
20 Burner
21 Heat exchanger
22 Heat exchanger
23 Feed connection
24 Discharge connection
25 Heat exchanger
26 Waste-air conduit
27 Waste-gas conduit
28 Header conduit

What is claims is:

1. A method for the recovery of waste heat from heated launderette machines, in particular trough mangles (10), dryers and/or finishers, comprising the step of at least partially recovering the condensation energy and/or the energy in the condensate of the waste heat, wherein the waste heat is cooled to such an extent that it condenses and the energy which is produced in the process and also the energy from the condensate are at least partially recovered.

2. The method according to claim 1, wherein the energy from the waste heat is recovered by at least one heat exchanger (14), with the temperature of a heat exchanger liquid being increased by the energy drawn from the waste heat by the heat exchanger (14).

3. The method according to claim 1, wherein the energy obtained from the waste heat during recovery is used to operate the launderette machine, which launderette machine requires thermal energy.

4. The method according to claim 1, wherein at least one heat exchanger is associated with a dedicated heating device of the launderette machine or with a central heating device for a plurality of the launderette machines.

5. A method for the recovery of waste heat from heated launderette machines, in particular trough mangles (10), dryers and/or finishers, comprising the step of at least partially recovering the condensation energy and/or the energy in the condensate of the waste heat, wherein energy which is produced when moist waste air is cooled and at least some condensation energy from the moist waste air and/or the energy of the condensate are reused.

6. The method according to claim 5, wherein at least one heat exchanger is associated with a dedicated heating device of the launderette machine or with a central heating device for a plurality of the launderette machines.

7. The method according to claim 5, wherein moist waste air from a trough mangle (10), from a dryer and/or from a finisher is used.

8. A method for the recovery of waste heat from heated launderette machines, in particular trough mangles (10), dryers and/or finishers, comprising the step of at least partially recovering the condensation energy and/or the energy in the condensate of the waste heat, wherein the moist waste air from the respective launderette machine is cooled to below the dew point, and the energy from the waste air which condenses in the process and/or from the condensate is at least partially recovered.

9. The method according to claim 8, wherein energy which is produced when waste gas from a heating device (19) is cooled and at least some of the condensation energy from the exhaust gas and/or the energy of the condensate are reused.

10. The method according to claim 8, wherein at least one heat exchanger is associated with a dedicated heating device of the launderette machine or with a central heating device for a plurality of the launderette machines.

11. A method for the recovery of waste heat from heated launderette machines, in particular trough mangles (10), dryers and/or finishers, comprising the step of at least partially recovering the condensation energy and/or the energy in the condensate of the waste heat, wherein waste gas from a heating device (19) for generating the thermal energy which is required by at least one launderette machine is cooled to below the dew point, and the energy of the waste gas which condenses in the process and/or the condensate is at least partially recovered.

12. The method according to claim 11, wherein the launderette machine and the heating device (19) each have at least one associated heat exchanger (14) or the launderette machine and the heating device (19) have at least one associated common heat exchanger (14).

13. The method according to claim 11, wherein moist waste air from a trough mangle (10), from a dryer and/or from a finisher is used.

14. The method according to claim 11, wherein energy in moist waste air, which is produced at least one mangle roller of the trough mangle (10), is used.

15. A method for the recovery of waste heat from heated launderette machines, in particular trough mangles (10), dryers and/or finishers, comprising the step of at least partially recovering the condensation energy and/or the energy in the condensate of the waste heat, wherein waste gas from a heating device (19) is used to heat a liquid or to generate steam for heating at least one mangle trough of a trough mangle (10) or the waste gas from a heating device (19) is used to generate drying air for a dryer.

* * * * *